United States Patent
Chan et al.

(10) Patent No.: US 6,633,935 B1
(45) Date of Patent: Oct. 14, 2003

(54) AUTOMATIC BUS TERMINATION READJUSTMENT

(75) Inventors: Wing Chan, Pleasanton, CA (US); David L. Griffith, Pleasanton, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 306 days.

(21) Appl. No.: 09/671,939

(22) Filed: Sep. 27, 2000

Related U.S. Application Data

(63) Continuation of application No. 09/115,144, filed on Jul. 14, 1998, now Pat. No. 6,192,433.

(51) Int. Cl.[7] .............................................. G06F 13/00
(52) U.S. Cl. ...................................................... 710/100
(58) Field of Search ................................. 710/100, 312, 710/302, 306, 300

(56) References Cited

U.S. PATENT DOCUMENTS

| | | | | |
|---|---|---|---|---|
| 5,680,555 A | * | 10/1997 | Bodo et al. | 710/306 |
| 6,026,456 A | * | 2/2000 | Ilkbahar | 710/100 |
| 6,061,806 A | * | 5/2000 | Caldwell et al. | 714/3 |
| 6,430,633 B1 | * | 8/2002 | Voloshin | 710/100 |

* cited by examiner

*Primary Examiner*—Rupal Dharia
*Assistant Examiner*—KIm T. Huynh

(57) ABSTRACT

An on line serviceable computing system employing a small computer system interface (SCSI) bus architecture connecting two host computers to at least one additional shared device including a termination adapter circuit that can sense when a SCSI termination at the end of the SCSI bus is lost and automatically switch in a new SCSI bus termination to thereby ensure that the bus is terminated at both ends as required for continuous operation.

15 Claims, 3 Drawing Sheets

FIG_3

AUTOMATIC BUS TERMINATION READJUSTMENT

CROSS-REFERENCES TO PRIOR APPLICATIONS

This application is a continuation-in-part of U.S. application Ser. No. 09/115,144, filed Jul. 14, 1998, now issued as U.S. Pat. No. 6,192,433, issued Feb. 20, 2001.

BACKGROUND OF THE INVENTION

The present invention relates generally to computing systems with bus-connected peripheral devices, and more particularly to systems having bus architectures that require termination.

An important and valuable part of any computing system today is its external storage facility. A presently preferred form of such storage is some type of hard disk structure because of its random access capability although other forms (e.g., tape, CD-ROM) are also used. This type of storage, often referred to as mass storage, is used to amass huge amounts of data for quick, easy access. There are a number of bus architectures capable of connecting a processor unit to such mass storage devices. One that is very flexible and powerful, particularly for connecting mass storage devices, and other peripheral elements, is the small computer system interface (SCSI).

The physical SCSI bus structure comprises a set of conductive signal lines that carry data and control signals for information transfer between the devices on the bus. Signals and data are communicated according to pre-determined protocols. (See, for example, Working Document for Information Technology SCSI Parallel Interconnect 2 (SPI-2), ANSI X3.302.)

A well-known physical characteristic of SCSI bus structures, shared by a number of other bus architectures, is that the signal lines forming the bus are terminated by an SCSI bus terminator at each end of the bus in order to reduce signal reflections of the bus that can degrade the information signals communicated thereon. Typically, the device or element connected at the bus' end includes the needed termination. Problems arise, however, when the device with the termination is removed from the bus, or the device is shut down. Removal/disconnection of the device with the terminator removes that termination, and often results in degradation of the signals communicated on the bus so that the entire system is effectively brought down. In order to continue operation, the termination must be moved to the next in line last device on the bus.

This problem can also occur if the connection of the last device is inadvertently disconnected, the entire system will again be affected because the communicating ability of the SCSI bus is lost. This is a problem that is not necessarily indigenous to SCSI bus architectures, but can be encountered by any bus architecture requiring some form of termination at the two ends of the bus to prevent degradation of the signals communicated thereon.

SUMMARY OF THE INVENTION

The present invention provides a method, and apparatus for implementing that method, for permitting failure or removal of that processing device that terminates the bus to which it is communicatively coupled. On-line service of a failed element that carries the termination of a bus to which the element connects is provided.

The present invention finds applicability in a processing system includes a number of processing devices coupled to a system bus for data communication therebetween. Those processing devices ("terminating devices") at each of the ends of the bus have the circuitry necessary for electronically terminating the system bus in order to minimize the reflections and other phenomena that can occur of such a bus as a result of high-speed data transmission. According to the present invention, one of the processing devices (other than the terminating devices) includes a termination adapter circuit. In the event the one of the terminating devices is removed or looses power, the termination adapter circuit will sense that removal or loss of power and automatically disconnect the bus connection to the failed or removed terminating device, and terminate the bus with a termination that replaces that lost with the failed or removed terminating device. The processing device having the termination adapter circuit now becomes the new terminating device, providing the requisite bus termination.

The invention is described in the context of a computing system in which processor units are coupled to peripheral devices (e.g., storage units) by a SCSI bus architecture. However, it will be apparent to those skilled in this art that the invention is applicable to any bus requiring termination. Conventionally, a SCSI bus structure includes, among the signal lines implementing that structure, a signal line carrying the signal "Termination Power" (TERM PWR). TERM PWR is a 5 volt signal that supplies current to the terminators at the end of the SCSI bus. In a preferred embodiment of the invention, TERM PWR is monitored by a termination adapter circuit located in association with a processing device coupled to the SCSI bus. Should the terminating device lose power, or the bus connection to the terminating device is interrupted, the TERM PWR signal will be lost. Loss of TERM PWR will be noted by the termination adapter circuit, causing it to switch in a new SCSI bus terminator. At the same time, the termination adapter circuit will electronically disconnect the bus from the failed or lost terminating device. The processing device associated with the termination adapter becomes the new termination device and thereby, the SCSI bus for data transfers remains.

The implementation is symmetric; the termination adaptor is located in each of those devices immediately proximate the next in line from the last devices on the SCSI bus. Therefore, the loss of a device on either end of the SCSI bus follows a similar procedure.

A number of advantages are achieved by the present invention. First, according to one embodiment of the invention, a system having a number of processing devices coupled to a bus having terminations at the ends of the bus can lose one termination (i.e., the terminating device having the termination) and continue to operate as before. Thus, the terminating device can be removed from the bus, or shut down for repair, without having to shut down the entire system connected to the bus even temporarily. The remaining processing elements can continue to operate.

In a further embodiment of the invention, both terminating devices to the bus can be removed or otherwise lost, yet the remaining devices can still communicate with one another.

Further, should the bus cable that connects to the terminating device be even inadvertently disconnected, the entire system is not caused to fail.

This invention is particularly useful in non-stop computer systems that require repair while the rest of the system continues to operate.

These and other advantages and aspects of the invention will become apparent to those skilled in the art upon a

DESCRIPTION OF THE SPECIFIC EMBODIMENTS

As indicated above, the popular SCSI bus architecture finds widespread acceptance and use in processing systems for communicatively coupling computing elements to peripheral devices to provide high-speed parallel data transfers therebetween. Accordingly, an embodiment of the invention will be described in the context of a SCSI structure. However, it will be evident to those skilled in this art that other bus architectures can employ the present invention.

Figure 1:
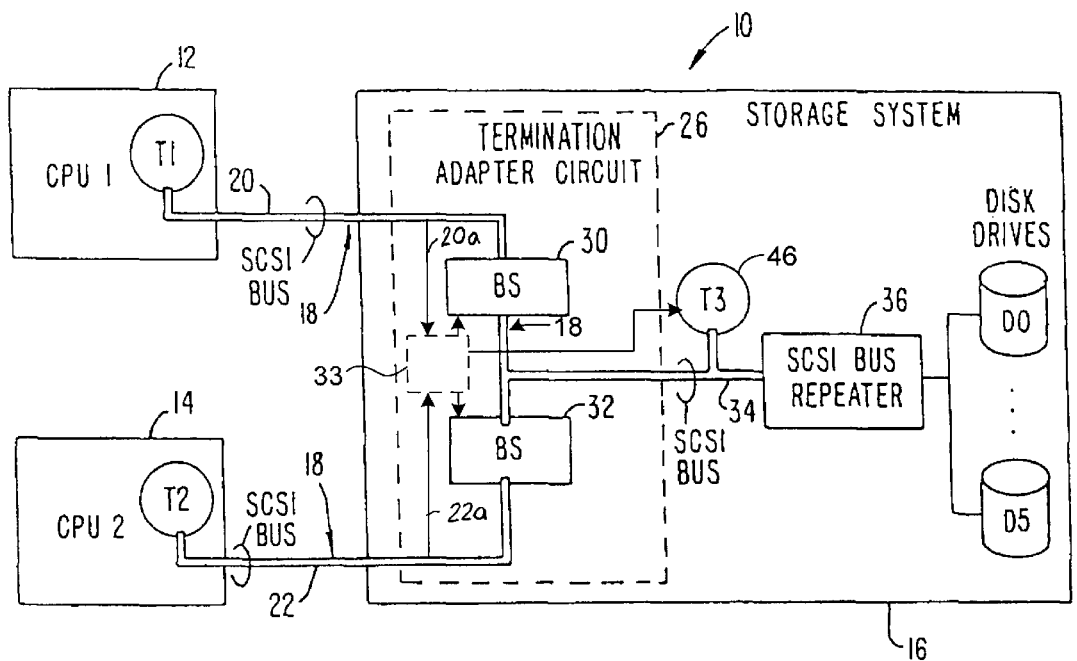
FIG. 1 illustrates employment of the invention in a processing system architecture having two host central processor units connected, by a bus architecture, to a storage system comprising a box of disk drive units.

Turning now to the figures, and for the moment specifically FIG. 1, there is illustrated a processing system, designated generally with the reference numeral 10, comprising a pair of central processor units (CPUs) 12, 14 connected to a mass storage system 16 by SCSI bus cables 20, 22. SCSI bus 18 comprises SCSI bus cables 20 and 22 and SCSI bus segment 34. The two CPUs 12 and 14 (used for reliability reasons) form the end devices for the SCSI bus 18, and therefore will contain SCSI bus terminators ($T_1$, $T_2$) as required for terminating the ends of the bus. As will be seen, the invention operates to allow the system to continue to operate should either of the CPUs 12, 14 be turned off, lose power, or otherwise disconnected from the storage system 16.

SCSI bus 18 is terminated at its ends, i.e., at each CPU 12, 14, in conventional fashion by the SCSI bus terminators T1 and T2. The SCSI cables 20, 22, connect, through a termination adapter circuit 26, comprising bus switches (BS) 30, 32 to SCSI bus segment 34. The SCSI bus segment 34 couples the termination adapter circuit 26 to storage devices (disk drives) D0–D5 through a SCSI bus repeater 36.

In operation, data transfers are executed between the CPUs 12,14 and the disk drives D0–D5 in conventional fashion, according to standard SCSI protocol, using the SCSI bus cables 20, 22, and bus segment 34 as the communicating medium. If, however, one of the CPUs 12, 14 loses power, or its associated cable 20, 22 becomes disconnected, this loss of power or disconnected cable will be detected by detector logic circuitry 33 (described below) contained in the termination adapter circuit 26. The termination adapter 26, sensing this loss/disconnection, will then operate to electronically disconnect the cable 20 or 22 (thereby disconnecting the associated SCSI bus terminator T1 or T2). And, at the same time it will electronically connect the SCSI bus terminator impedance T3 to the remainder of the SCSI bus 18 so that the SCSI bus architecture again has terminations at each end of the bus structure. Should the CPU 12, 14 that lost power, or was disconnected, be re-powered or connected, the termination adapter circuit 26 will also sense that circumstance, and accordingly disconnect the SCSI bus terminator T3, and electronically re-connect the cable 20 or 22 to the SCSI bus segment 34, thereby reconnecting the previously lost CPU 12 or 14 with its associated termination resistance T1 and T2.

Figure 2:
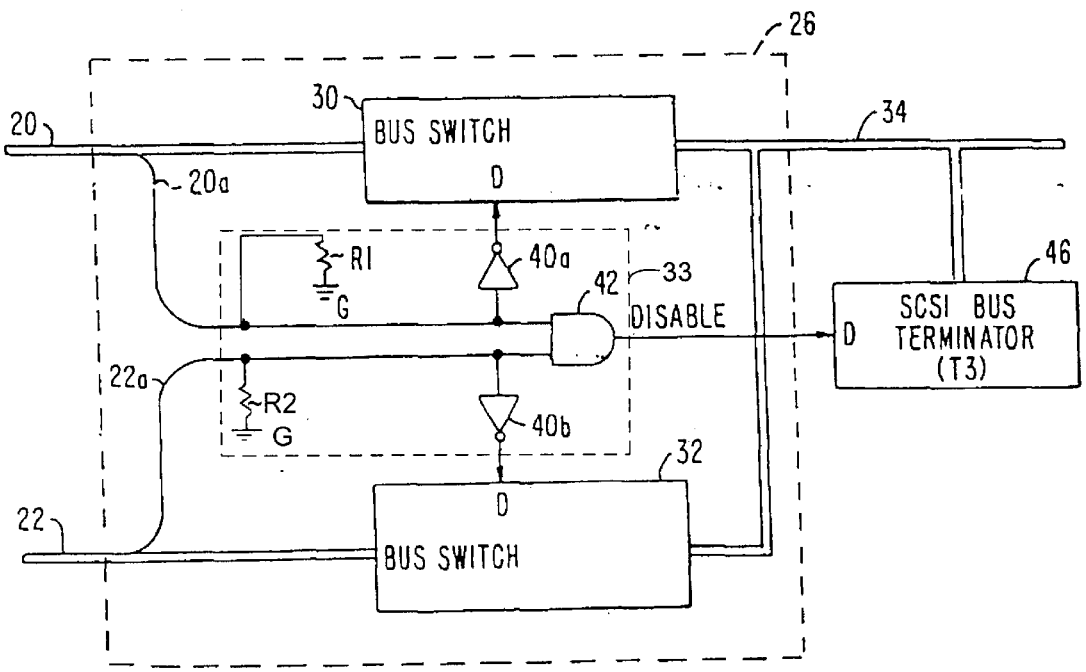
FIG. 2 illustrates the termination adaptor circuit that forms a part of the storage system of FIG. 1 to switch to a new bus terminator and electronically disconnect the bus to the former last device, should one of the end units be disconnected or lose power.

FIG. 2 shows the termination adapter circuit 26 in greater detail. Typically, SCSI bus constructions are implemented to carry a positive 5 volt (DC) termination power (TERM PWR) signal. As shown in FIG. 2, the signal lines 20a, 22a from the SCSI cables 20, 22, respectively, carrying TERM PWR supplied by 12 and 14 are brought out in the termination adapter circuit 26 and applied to inverter-drivers 40 (40a, 40b) and to an AND gate 42. In addition, pull down resistors R1 and R2 connect the signal lines 20a, 22a to a ground potential (G). A detection logic 33 includes the pull-down resistors R1 and R2, the inverter-drives 40 and the AND gate 42.

The outputs of the inverter-drivers 40a, 40b respectively connect to the disable (D) inputs of the bus switches 30, 32. The output of the AND gate, carrying a DISABLE signal, connects to the disable (D) input of a SCSI bus terminator T3 46.

The SCSI bus terminator 46 provides the requisite impedance (resistors) to terminate a SCSI bus when operating in a "connect" mode (i.e., when the DISABLE signal from the AND gate is HIGH). The SCSI bus terminator 46 will assume a second, a "disconnect," mode to disconnect the terminating impedance when the DISABLE signal is LOW. An example of such a terminator is that produced by Unitrode Corporation of Merrimac, N.H., and sold under the part number UC5608. (For convenience the terminator is also used for the SCSI bus terminators T1 and T2, although only in the first mode.)

In operation, i.e., when the CPUs 12, 14 are powered normally, and the SCSI bus cables 20, 22 are connected between the CPUs and the storage system 16 (FIG. 1), the signal lines 20a, 22a, will be carrying the positive 5 volt TERM PWR signal. Accordingly, the disable (D) inputs of the bus switches 30, 32 will receive a LOW from the inverter-driver elements 40 which, in effect, "enables" each bus switch so that the signals on the SCSI bus cables 20, 22 are communicated to the SCSI bus segment 34. In addition, the two TERM PWR signals are applied to the AND gate 42 to produce a logic HIGH that, when applied to the disable (D) input of SCSI terminator T3 (element 46), disables SCSI Terminator T3. When disabled, the SCSI terminator T3 is disconnected from the SCSI bus segment 34.

Now assume that the CPU 12 either looses power or, for whatever reason, the SCSI bus cable 20 is disconnected from either the CPU 12 or the storage system 10. This will cause an absence of the TERM PWR signal carried by the signal line 20a. This loss of TERM PWR will, through the pull down resistor R1, cause the input to the inverter-driver element 40a to go LOW, driving its output HIGH. The now HIGH signal at the output of the inverter-driver 40a will be applied to the (D) input of the bus switch 30. This causes the bus switch 30 to respond by electronically disconnecting the SCSI signal lines of the SCSI cable 20 from the SCSI bus segment 34. At the same time, the absence of the 5 volt TERM PWR signal will disable the AND gate 42 to produce the DISABLE signal that is applied to the disable (D) input of the SCSI bus Terminator 46. In response, the SCSI bus Terminator 46 will electronically connect termination resistances to the SCSI bus segment 34. Thus, the loss of the SCSI bus termination T1 has been replaced with the SCSI bus termination 46 (T3). The storage system 16 and the CPU 14 now are the end devices of the SCSI bus 18.

As indicated above, the operation is symmetric. That is, should CPU 14 loose power, or the SCSI bus cable 22 become disconnected, the bus switch 32 will react to the loss of the TERM PWR signal carried by the signal line 22*a* in the same manner: bus switch 32 will, in effect, disconnect the SCSI bus cable 22 from the SCSI bus segment 34, and, in the same manner as described above, electronically connect the SCSI bus termination resistance T3 to the SCSI bus segment 34.

The bus switches 30 and 32 may be a high-speed CMOS 10-bit bus switch such as manufactured by Quality Semiconductor Incorporated of 851 Martin Avenue, Santa Clara, Calif., part number QS3384, QS32384. The SCSI Bus Repeater 36 can be a repeater/converter device manufactured by Simbios Logic of Fort Collins, Colo. (manufactured under the part number SYM53C120).

For cost, simplicity, and to maintain the integrity of the SCSI bus connections, the SCSI terminations T1 and T2 are preferably built into the CPUs at the end of the SCSI chain. External terminations would allow a maintenance person to inadvertently remove the terminator and not replace it. Notice that when a SCSI cable 20 or 22 is removed from either CPU for the service of that CPU, the built-in termination T1 or T2 is removed at the same time. This would bring down an ordinary system, but not with employment of the present invention.

For the same reasons, the SCSI bus termination 46 (T3) is built into the mass storage system 16 so that the SCSI chain is not broken by accidentally removing the termination T3 while a cable is disconnected or removed.

There are generally three types of SCSI terminations in use today; single ended, high voltage differential and low voltage differential. The present invention is independent of, and can work with, any kind of termination. However, as those skilled in this art will recognize, the bus switches 30 and 32 will need to be compatible with the electrical characteristics of the SCSI bus.

Figure 3:
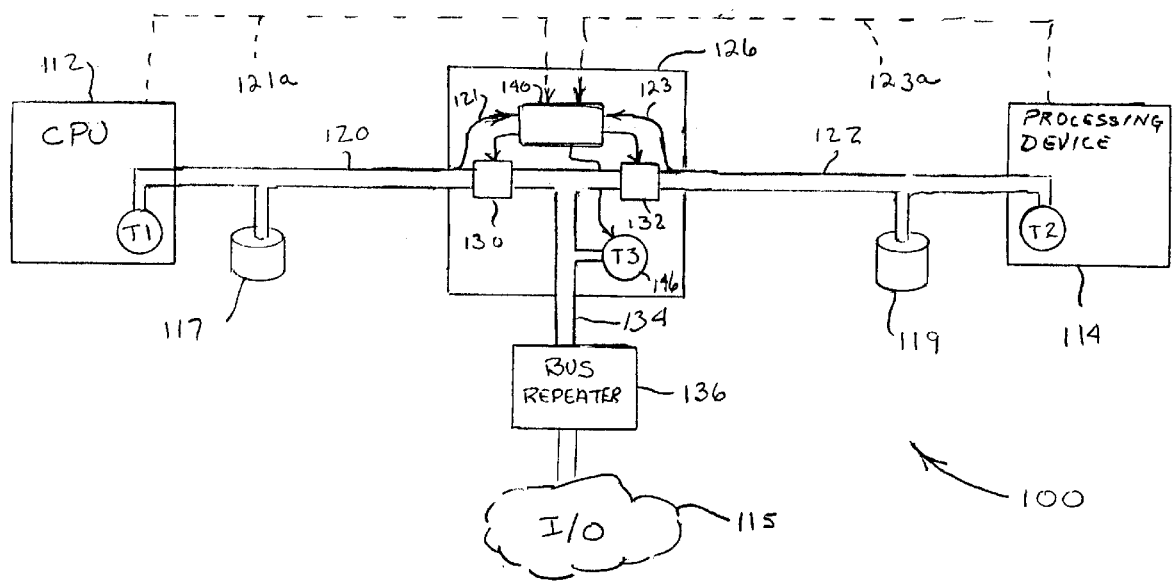
FIG. 3 illustrates use of the present invention in a more general bus environment.

Although the invention has been described in the context of a processing system employing a SCSI bus architecture, it should be evident that processing systems employing other bus architectures can utilize the invention to good advantage. For example, illustrated in FIG. 3 is a general representation of a processing system 100, comprising a central processing unit (CPU) 112 coupled through bus segments 120, 122 to a processing device 114 and, via a termination adapter 126, also to a plurality of input/output peripheral units represented generally as 115. The termination adapter circuit 126 is constructed according to the teachings of the present invention. The bus segments 120, 122, termination adapter 126 (and associated bus segment 134 to the bus repeater 136) form the bus structure for information transfers between the CPU 112, processing device 114 and input/output peripheral units 115.

The processing device 114 could be another CPU, or a peripheral device of one sort or another.

As FIG. 3 illustrates, the CPU 112 and the processing device 114 each respectively have associated a storage device 117, 119 coupled to respective bus segments 120, 122. And, each has a bus termination (T1, T2, respectively) for terminating the bus segments 120, 122 in conventional fashion.

The termination adapter circuit 126 includes bus switches 130 and 132, a bus terminator 146 (T3), and detection logic 140. The bus segments 120 and 122 are coupled to a bus segment 134 through the bus switches 130 and 132, respectively. "In-band" signal lines 121, 123 (i.e., signal lines carried by the bus segments 120, 122) are brought out within the termination adapter circuit 126 and applied to the detection logic 140. Note that, as illustrated by the signal lines 121*a*, 123*a* (represented in phantom to show that they are an alternative to the in-band signal lines 121, 123), the signal lines to the detection logic need not be in-band, but may alternatively be external, i.e., in addition to the bus segments 120, 122. Whether in-band and carried by the bus segments 120, 122) or external, as represented in phantom by the signal lines 121*a*, 123*a*, their function is to carry signals from the CPU 112 (in the case of signal line 121 (or 121*a*)) and from the processing device 114 (in the case of signal line 122 (or 122*a*)) that indicate that the source element (CPU 112 or processing device 114) is still functioning. The signals, for example, could be a simple DC potential, as is used in the context of the SCSI bus structure described above.

The signals carried by the signal lines 121, 123 are received by a detection unit 140. Detection unit 140, in turn, is operationally coupled to bus switches 130, 132. Presence of the potential indicates the source element is still present and operating. Absence of the potential on a one of the signal lines 121, 123 (or 121*a*, 123*a*) may indicate that the source element has failed or has been removed, and that the associated bus segment needs a termination. Thus, in operation, the presence of the signals on the signal lines 121, 123 (or 121*a*, 123*a*) will be detected by the detection unit 140 which, in turn, controls the bus switches 130, 132 to electrically couple the bus segments 120, 122, and 134 together for communicating information signals thereon. In addition, the bus termination 146 is electrically disconnected.

Now, assume that the processing element 114 fails, or is removed, so that the bus segment 122 no longer has the termination supplied by the processing device via the terminator T2. Loss of the processing device 114, and more importantly the termination T2, will result in the loss of the DC potential it sources on signal line 123 (or 123*a*). This loss of potential, in turn, is detected by the detection logic 140, to cause it to operate the bus switch 132 to electronically disconnect the bus segment 122 from the system, and to electrically connect the terminator T3 to reestablish a termination to the (new) end of the bus structure. The remaining portions of the bus, bus segments 120 and 134, are again properly terminated by the termination 146 so that communication between the CPU 112 and I/O 115, as well as the storage device 117 associated with the CPU 112, can continue. Should the processing element 114 resume normal functioning, or be replaced, the potential on signal line 123 (123*a*) will be reestablished, and in response the detection unit 140 will disconnect the termination 146 and reconnect the bus segments 122, 134 to one another through the bus switch 132.

Although a potential was used in the description of the operation of the invention of the system 100, it will be now be evident that other forms of signaling may be used. For example, the signal lines 121, 123 (or 121*a*, 123*a*) could alternately carry a periodic digital signal whose absence, over a period of time, indicates a failure or removal of the source of the signal. The periodic signal could be a pulse sent every X milliseconds, or a continuing varying signal, or some other form of indicating presence/operability of the sending element.

Figure 4:
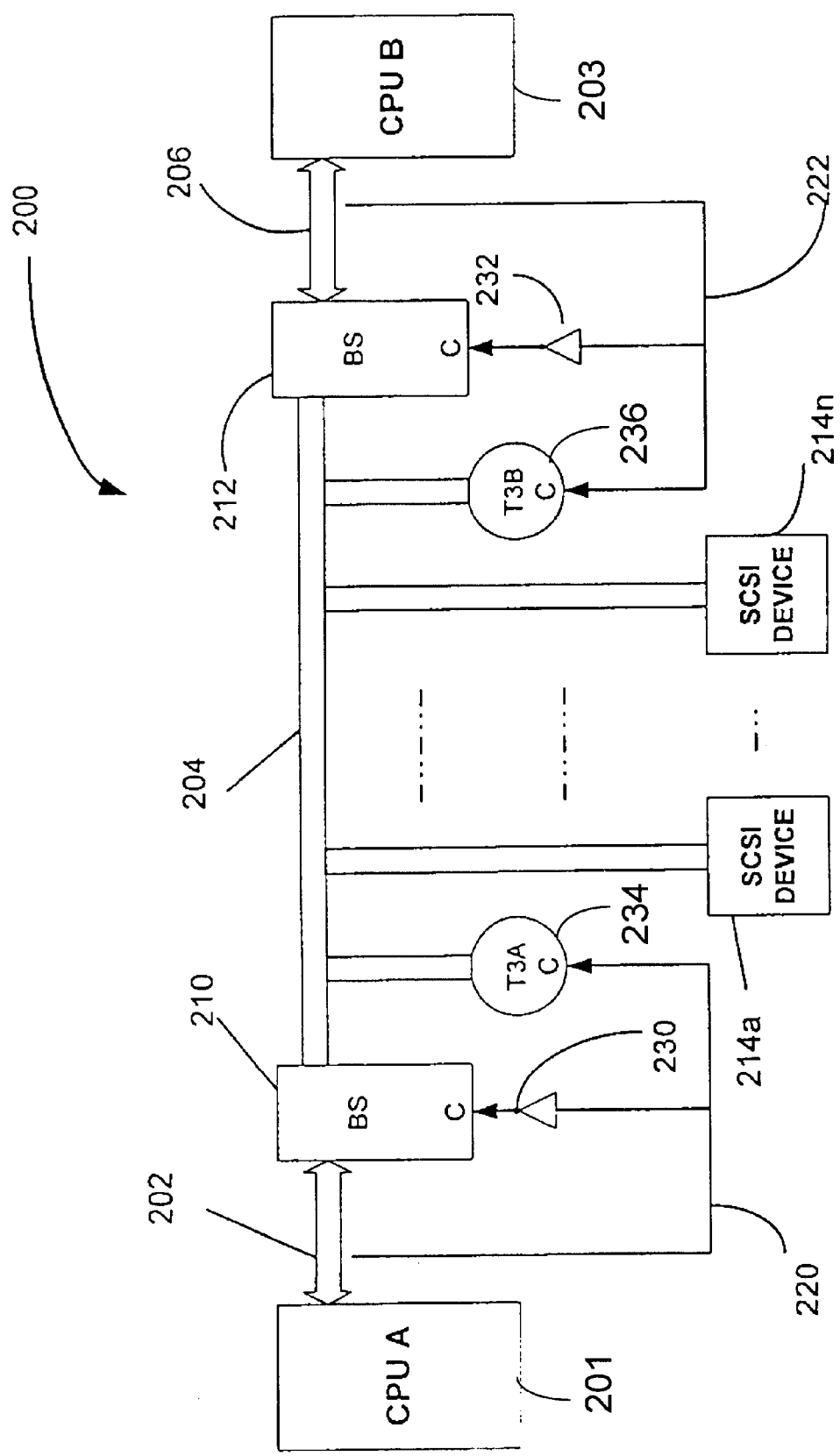
FIG. 4 illustrates an alternate embodiment of the invention.

Turning now to FIG. 4, there is illustrated a further embodiment of the invention. A system 200 is shown as indicating a pair of processing elements, shown here as a pair of CPUs (CPU A 201 and CPU B 203), although as indicated above, they could be other types of processing elements. The CPUs 201 and 203 are communicatively coupled to one another by a bus structure comprising bus segments 202, 204 and 206. Bus segments 202, 204 and 206, are respectively coupled through bus switches 210 and 212. Coupled to the bus segment 204 are a number of SCSI devices 214a, . . . , 214n, and proximate the ends of the bus segment 204 that couple to the bus switches 210, 212 are bus terminators T3A 234 and T3B 236. The bus terminators 234 and 236 have associated circuitry (not shown) that allow them to be selectively coupled or de-coupled to the bus segment 204 in response to a signal (actually, lack of signal) received at its control input (C) on line 220. Signal line 220 is also applied, through an inverter 230, to the control input (C) of the bus switch 210. The signal line 220 may form a part of the bus segment 202, or it may be separate line, not associated with the bus segment 202.

Similarly, a signal line 222 carries a signal that is applied to the control inputs (C) of the bus termination T3B 236 and, through an inverter 232, of bus switch 212.

In operation, the bus segments 202, 204, and 206 form a bus structure that is properly terminated at its two ends by bus terminations (not shown) contained in or associated with the CPU A 201 and CPU B 203, allowing data communication thereon between the CPUs and the SCSI devices 214. However, should one of the CPUs be lost, for example by CPU A 201 being removed the loss of that CPU will similarly result in the loss of the signal carried by the signal line 220. This signal loss, in turn, will be detected by the bus switch 210 and the bus termination T3A 234. The bus switch 210 will respond by electronically disconnecting the bus segment 202 from the remaining bus structure. Also, the bus termination T3A 234 responds to the signal loss by electronically connecting to and terminating the bus segment 204. The new bus structure now formed by disconnecting the bus segment 202 is now properly terminated at the ends proximate the bus switch 210 and the CPU B 203 (by the bus termination contained in or associated with the CPU A 201). A similar procedure would be followed if the CPU B 203 were to be lost.

Note that if any of the SCSI devices are removed, there is no need to add bus terminations. Also, it should be apparent that both the CPU A 201 and CPU B 203 could be lost to still have a properly terminated bus structure, in this instance the bus structure now formed by only the bus segment 204.

What is claimed is:

1. A processing system, comprising:
   first and second processing devices each respectively coupled to first and second bus segments, each of the first and second processing devices having a termination component for electrically terminating an end of the respective first and second bus segments, each of the first and second terminating devices supplying a termination potential;
   a bus interface unit, including first and second bus switch elements coupled to a third bus segment and respectively to the first and second bus segments;
   a processing elements coupled to the third bus segment;
   a detection unit coupled to receive the termination potential from the first and second processing devices to de-couple the first bus segment from the third bus segment and couple a termination impedance to the third bus segment.

2. The processing system of claim 1, wherein each of the first and second bus segments includes a signal line respectively carrying the termination potential from the first and second processing devices.

3. The processing system of claim 1, further comprising:
   signal lines for coupling the respective termination potential from each of the first and second processing devices to the detection unit.

4. The processing system of claim 3, wherein the signal lines form a part of the first and second bus segments.

5. A processing system as recited in claim 1, further comprising:
   first and second storage devices coupled to the first and second bus segments, respectively.

6. A processing system, comprising
   first and second processing devices each respectively coupled to first and second bus segments, each of the first and second processing devices having a termination component for electrically terminating an end of the respective first and second bus segments, each of the first and second processing devices supplying a termination potential;
   first and second bus switch elements coupled to a third bus segment and respectively to the first and second bus segments;
   first and second bus terminators, each configured for being selectively coupled to the third bus segment, wherein in an absence of the termination potential from the first processing device the first terminator is coupled to the third bus segment;
   a plurality of SCSI devices coupled to the third bus segment and positioned between the first and second bus terminators; and
   first and second inverters each respectively coupled to receive the termination potential from the first and second processing devices, the first inverter activating the first bus switch element to de-couple the first bus segment from the third bus segment in the absence of the termination potential from the first processing device.

7. The processing system of claim 6, wherein each of the first and second bus segments includes a signal line respectively carrying the termination potential from the first and second processing devices.

8. The processing system of claim 6, further comprising:
   signal lines for coupling the respective termination potential from each of the first and second processing devices to the corresponding first and second inverters and corresponding first and second bus terminators.

9. The processing system of claim 8, wherein the signal lines form a part of the first and second bus segments.

10. A method for automatic bus termination readjustment, comprising:
    coupling first and second processing devices to first and second bus segments, respectively, each processing device having a termination component and supplying a termination potential;
    coupling first and second bus switch elements to a third bus segment and respectively to the first and second bus segments;
    determining the presence of termination potentials from the first and second processing devices; and
    in an absence of the terminating potential from the first processing device,
        de-coupling the first bus segment from the third bus segment by activating the first bus switch element, and coupling a termination impedance to the third bus segment.

11. Computer readable medium embodying program code with instructions for automatic bus termination readjustment, comprising:

program code for causing a computer to couple first and second processing devices to first and second bus segments, respectively, each processing device having a termination component and supplying a termination potential;

program code for causing a computer to couple first and second bus switch elements to a third bus segment and respectively to the first and second bus segments;

program code for causing a computer to determine the presence of termination potentials from the first and second processing devices; and in an absence of the terminating potential from the first processing device,
program code for causing a computer to de-couple the first bus segment from the third bus segment by activating the first bus switch element, and
program code for causing a computer to couple a termination impedance to the third bus segment.

12. A processing system for automatic bus termination readjustment, comprising means for coupling first and second processing devices to first and second bus segments, respectively, each processing device having a termination component and supplying a termination potential;

means for coupling first and second bus switch elements to a third bus segment and respectively to the first and second bus segments;

means for determining the presence of termination potentials from the first and second processing devices; and in an absence of the terminating potential from the first processing device,
means for de-coupling the first bus segment from the third bus segment by activating the first bus switch element, and
means for coupling a termination impedance to the third bus segment.

13. A method for automatic bus termination readjustment, comprising:

coupling first and second processing devices to first and second bus segments respectively, each processing device having a termination component and supplying a termination potential;

coupling first and second bus switch elements to a third bus segment and respectively to the first and second bus segments;

providing first and second bus terminators, each with associated circuitry for allowing it to be selectively coupled or de-coupled to the third bus segment;

determining the presence of the termination potentials from the first and second processing devices; and in an absence of the terminating potential signal from the first processing device,
de-coupling the first bus segment from the third bus segment by activating the first bus switch element, and
coupling the first bus terminator electrically to the third bus segment.

14. Computer readable medium embodying program code with instructions for automatic bus termination readjustment, comprising:

program code for causing a computer to couple first and second bus switch elements to a third bus segment and respectively to the first and second bus segments;

program code for causing a computer to provide first and second bus terminators, each with associated circuitry for allowing it to be selectively coupled or de-coupled to the third bus segment;

program code for causing a computer to determine the presence of the termination potentials from the first and second processing devices; and in an absence of the terminating potential signal from the first processing device,
program code for causing a computer to de-couple the first bus segment from the third bus segment by activating the first bus switch element, and
program code for causing a computer to couple the first bus terminator electrically to the third bus segment.

15. A system for automatic bus termination readjustment, comprising means for coupling first and second bus switch elements to a third bus segment and respectively to the first and second bus segments;

means for providing first and second bus terminators, each with associated circuitry for allowing it to be selectively coupled or de-coupled to the third bus segment;

means for determining the presence of the termination potentials from the first and second processing devices; and in an absence of the terminating potential signal from the first processing device,
means for de-coupling the first bus segment from the third bus segment by activating the first bus switch element, and
means for coupling the first bus terminator electrically to the third bus segment.

* * * * *